United States Patent
Goehlich et al.

(10) Patent No.: US 9,032,797 B2
(45) Date of Patent: May 19, 2015

(54) SENSOR DEVICE AND METHOD

(75) Inventors: Andreas Goehlich, Rheurdt (DE); Hoc Khiem Trieu, Westergellersen (DE); Robert Klieber, Dortmund (DE); Carole Jonville, Graz (AT)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 225 days.

(21) Appl. No.: 13/370,464

(22) Filed: Feb. 10, 2012

(65) Prior Publication Data

US 2012/0210794 A1 Aug. 23, 2012

(30) Foreign Application Priority Data

Feb. 11, 2011 (DE) .......................... 10 2011 011 019
Apr. 8, 2011 (DE) .......................... 10 2011 007 048

(51) Int. Cl.
G01M 7/02 (2006.01)
G01B 5/28 (2006.01)

(52) U.S. Cl.
CPC ...................................... G01M 7/022 (2013.01)

(58) Field of Classification Search
USPC .............. 73/579, 632, 642, 644, 105, 862.41, 73/861.18, 28.01, 24.04, 24.06, 24.01, 73/23.35, 23.36
See application file for complete search history.

(56) References Cited

U.S. PATENT DOCUMENTS

| | | | | |
|---|---|---|---|---|
| 4,334,168 | A * | 6/1982 | Besson et al. .................. | 310/343 |
| 4,375,604 | A * | 3/1983 | Vig ................................ | 310/312 |
| 5,112,642 | A * | 5/1992 | Wajid ............................. | 427/10 |
| 6,497,141 | B1 | 12/2002 | Turner et al. | |
| 7,305,883 | B2 | 12/2007 | Khuri-Yakub et al. | |
| 7,395,698 | B2 * | 7/2008 | Degertekin ..................... | 73/105 |
| 7,504,910 | B2 * | 3/2009 | Kawamura et al. ........... | 333/187 |
| 7,936,110 | B2 * | 5/2011 | Andle et al. .................. | 310/333 |
| 8,136,406 | B2 * | 3/2012 | Sato et al. ....................... | 73/702 |
| 8,294,332 | B2 * | 10/2012 | Matsumoto et al. .......... | 310/320 |
| 8,490,462 | B2 * | 7/2013 | Swanson et al. ................ | 73/1.38 |
| 2005/0200241 | A1 * | 9/2005 | Degertekin ..................... | 310/334 |
| 2007/0059858 | A1 * | 3/2007 | Caronti et al. ................. | 438/50 |
| 2011/0041224 | A1 * | 2/2011 | Raman et al. .................. | 850/40 |

OTHER PUBLICATIONS

Younis et al., "Exploration of New Concepts for Mass Detection in Electrostatically-Actuated Structures Based on Nonlinear Phenomena," Journal of Computational and Nonlinear Dynamics, vol. 4, Apr. 2009, 15 pages.

Zhang et al., "Application of Parametric Resonance Amplification in a Single-Crystal Silicon Micro-Oscillator Based Mass Sensor," Sensors and Actuators A 122, Mar. 2005, pp. 23-30.

Zhang et al., "Effect of Cubic Nonlinearity on Auto-Parametrically Amplified Resonant MEMS Mass Sensor," Sensors and Actuators A 102, Aug. 2002, pp. 139-150.

Disclosed Anonymously, "Chemical/Biological Sensing Platform", Prior Art Database, IPCOM000199103D, Aug. 26, 2010, pp. 1-10.

* cited by examiner

*Primary Examiner* — Helen Kwok

(74) *Attorney, Agent, or Firm* — Keating & Bennett, LLP

(57) ABSTRACT

A sensor device including a mechanical oscillator, an excitation unit which is configured to excite the mechanical oscillator to perform a mechanical oscillation within a non-linear range at a varying excitation frequency, and an evaluation unit configured to detect a jump, arising as a result of anharmonicity, in a resonance oscillation of the mechanical oscillation of the mechanical oscillator.

20 Claims, 11 Drawing Sheets

SENSOR DEVICE AND METHOD

CROSS-REFERENCE TO RELATED APPLICATIONS

This application claims priority from German Patent Application No. 102011007048.6-52, which was filed on Apr. 8, 2011 and is incorporated herein in its entirety by reference.

The present invention relates to a sensor device and to a corresponding method.

BACKGROUND OF THE INVENTION

It is known to exploit the frequency shift of oscillating (vibrating) mechanical systems, in particular of micro- and/or nanomechanical systems, for the purpose of ultrasensitive, quantitative identification of small masses (e.g. within the range of several femtograms to nanograms).

Examples of possible applications of such mass-sensitive sensors are found in biological and chemical sensor technology. For this purpose, a mechanically oscillating membrane comprises a functional layer to which essentially only analytes of a specific type adhere and/or into which only analytes of a specific type are incorporated. Examples are, e.g., adhesion of antibodies to which only matching antigens may dock (key/lock principle). Systems known as oscillating systems are quartz crystal microbalances (QCM), micro- or nanomechanical beam structures (cantilevers) and also membrane structures, for example.

For example, utilization of functionalized so-called CMUT (capacitive micromachined ultrasonic transducer) structures has been suggested for identifying analytes. Such structures are essentially formed as parallel-plate capacitors having one fixed and one elastically movable electrode, respectively. By applying a periodic voltage between the two electrodes, the movable electrode may be excited to perform mechanical oscillations. If the exciting frequency is tuned in the vicinity of the mechanical resonance frequency, the deflection that is achieved accordingly is excessive. Such structures may be manufactured using known methods of surface micromechanics.

In the U.S. Pat. No. 7,305,883 by Khuri-Yakub et al., a mass-sensitive chemical sensor is described wherein the mass-sensitive elements are configured as CMOS structures. The mass-sensitive elements are electrically wired into the feedback path of an amplifying circuit, e.g. of the so-called Pierce type. The amplification and/or feedback factor is adjusted such that the oscillator starts to oscillate. In an advantageous embodiment, the CMOS sensor chip is provided, in accordance with conventional technology, with wafer vias and is bonded onto a wafer comprising readout electronics.

With this type of mass-sensitive sensors, which are operated as "self-oscillators" at the resonance, the change in the oscillation frequency is evaluated by additional loading with mass (adsorption, or absorption) on the part of the analytes, e.g. by means of a frequency count.

However, for a high level of identification sensitivity, such self-oscillating circuits necessitate a high quality, which may result in, e.g., low sensitivity when measuring dense media. Moreover, such circuits are sensitive to thermal drifting of structural components. In addition, a mass-sensitive switch has been suggested by M. Younis et al. in the article "Exploration of New Concepts for Mass Detection in Electrostatically-Actuated Phenomena", J. Computational and nonlinear Dynamics, Vol. 4, 2009. Said switch is also based on an electrically excited micromechanical system; however, a non-linear electromechanical effect, i.e. the so-called "pull-in instability" or "escape" effect, is used here.

In the mass-sensitive switch proposed there, the parameters, i.e. the DC and/or AC amplitude(s) of the exciting voltage, are set such that the oscillating electromechanical element is pulled onto the fixed electrode ("pull-in effect") within a narrow frequency range (instable frequency range) in the vicinity of the resonance. This may visually be described by mass escaping from a potential well in the event of too large an energy supply in the vicinity of the resonance. If the membrane is initially excited within a frequency range below the instable frequency range, applying an additional mass onto the oscillating electromechanical element will shift the resonance frequency such that the excitation frequency will now be within the instable range and that the "pull-in effect" will occur. The switch is mechanically closed. However, since this arrangement evaluates two states only, mass identification with the aid of the non-linear electromechanical "pull-in effect" is not quantitative.

SUMMARY

According to an embodiment, a sensor device may have: a mechanical oscillator configured as a membrane which encloses an internal volume on its inner surface; an excitation unit configured to excite the mechanical oscillator to perform a mechanical oscillation within a non-linear range at a varying excitation frequency $\omega$; and an evaluation unit configured to detect a jump, arising as a result of anharmonicity, in a resonance of the mechanical oscillation of the mechanical oscillator.

According to another embodiment, a method of operating a sensor device including a mechanical oscillator may have the steps of: exciting a mechanical oscillator, configured as a membrane, to perform a mechanical oscillation within a non-linear range at a varying excitation frequency $\omega$; and detecting a jump, arising as a result of anharmonicity, in a resonance of the mechanical oscillation of the mechanical oscillator, the membrane hermetically enclosing an internal volume on its inner surface.

Another embodiment may have a computer program having a program code for performing the method of operating a sensor device including a mechanical oscillator, which method may have the steps of: exciting a mechanical oscillator, configured as a membrane, to perform a mechanical oscillation within a non-linear range at a varying excitation frequency $\omega$; and detecting a jump, arising as a result of anharmonicity, in a resonance of the mechanical oscillation of the mechanical oscillator, the membrane hermetically enclosing an internal volume on its inner surface, when the program runs on a computer.

The present invention provides a sensor device comprising a mechanical oscillator, an excitation unit configured to excite the mechanical oscillator to perform mechanical oscillation within a non-linear range at a varying excitation frequency, and comprising an evaluation unit configured to detect a jump, arising due to anharmonicity, in a resonance of the mechanical oscillation of the mechanical oscillator.

It is the finding of the present invention that it is possible to provide quantitative sensor evaluation at reduced manufacturing cost if a jump, arising due to anharmonicity, in a resonance of the mechanical oscillation of a mechanical oscillator, which is excited within a non-linear range for this purpose, is used for evaluation. Since the jump is detectable in a precise manner, a high level of accuracy of the sensor evaluation is readily possible. In addition, the requirements placed upon the quality of the mechanical oscillation system consisting of the mechanical oscillator and the excitation unit are relatively low. Conversely, the jump in the resonance oscillation exhibits an evaluatable dependence on a force applied at the mechanical oscillator, which force results from a pressure difference, for example, or exhibits an evaluatable dependence on a different quantity influencing the frequency position of the mechanical resonance, such as a mass loaded at the mechanical oscillator. In this manner, sensor devices in accordance with embodiments of the present invention form pressure sensors or mass sensors, for example. Such a sensor device may be integrated directly with a CMOS readout circuit, for example, and may be manufactured in a simple manner by means of CMOS technologies, for example.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
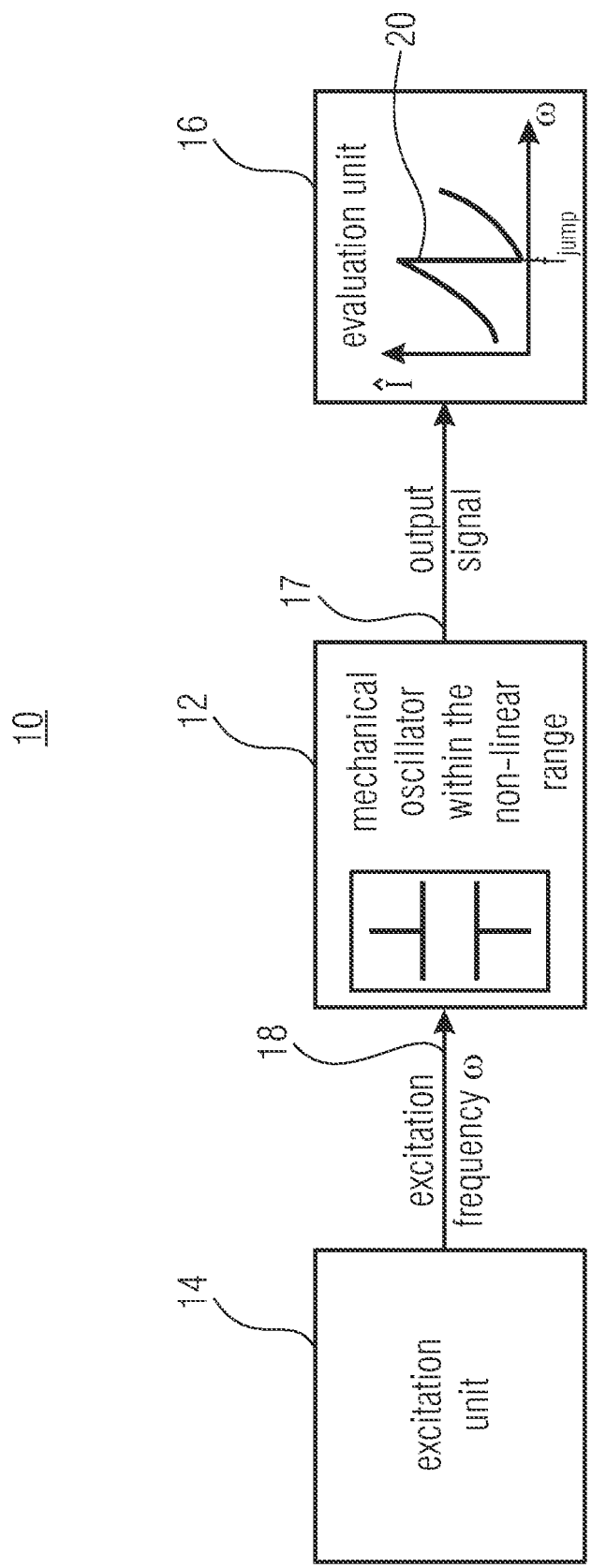
FIG. 1 shows a block diagram of a sensor device in accordance with an embodiment.

Before various embodiments of the present invention will be described below with reference to the drawings, it shall be noted that identical elements coming up in these figures are provided with identical reference numerals and that repeated descriptions of said elements and of their functions shall be omitted to avoid repetitions.

FIG. 1 shows a sensor device 10 comprising a mechanical oscillator 12, an excitation unit 14 and an evaluation unit 16. The excitation unit 14 is configured to excite the mechanical oscillator 12 within a non-linear range to perform mechanical oscillation, i.e. non-linear oscillation. To this end, the excitation unit 14 uses a varying excitation frequency ω 18. The evaluation unit 16 is configured to detect a jump 20, arising due to anharmonicity, in a resonance of the mechanical oscillation of the mechanical oscillator 12. The jump 20 arises when the excitation frequency ω is varied by the excitation unit 14. As is indicated in FIG. 1, the jump 20 makes itself felt in that while the excitation frequency ω is varied across a frequency $f_{jump}$, an amplitude of oscillation $\hat{w}_0$ of the mechanical oscillation of the mechanical oscillator 12 jumps abruptly, as will be explained in more detail below. The frequency $f_{jump}$ at which the jump occurs depends on the quantity to be measured, such as the pressure or the loading mass of the mechanical oscillator 12. The oscillation with the amplitude of oscillation $\hat{w}_0$ may be sensed, for example, by means of a current having an amplitude of oscillation $\hat{I}$ or phase of same via an electrical signal 17, which will also be sometimes referred to as an output signal below and which suitably depends on the mechanical deflection of the mechanical oscillator 12.

Even though embodiments will be described below wherein the mechanical oscillator 12 is configured as a membrane, it shall be pointed out that it would also be possible for the mechanical oscillator to be configured, for example, as a plate or membrane suspended in an oscillatory manner. In this embodiment it is assumed that the membrane of the mechanical oscillator 12 is formed from a conductive material, such as doped polysilicon or metal, for the purpose of electrically sensing the mechanical oscillation and for the purpose of electrostatic excitation; however, other materials, which are, for example, provided with a conductive coating, would also be feasible. The excitation unit 14 performs the excitation of the mechanical oscillator 12, e.g. in an electrostatic manner, by applying an alternating voltage having the varying excitation frequency ω 18 to the mechanical oscillator 12, for example with a sinusoidal excitation; other forms of excitation would also be feasible, however. The evaluation unit 16 is an electric circuit, for example, connected to an electrode of the mechanical oscillator 12 and/or to a fixed electrode, located opposite same, of the mechanical oscillator 12, and may additionally include a digital evaluation unit, such as a CPU or the like.

Figure 2:
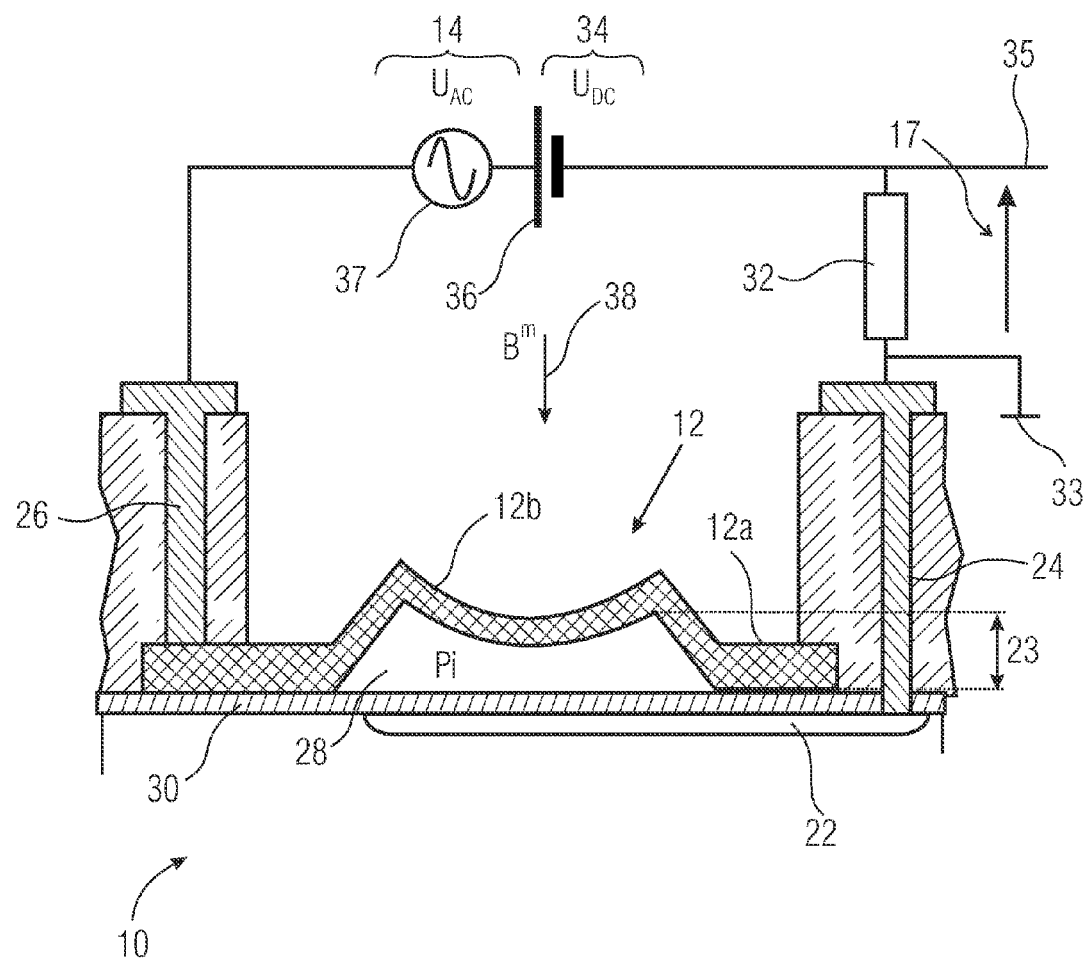
FIG. 2 shows a schematic sectional side view of a sensor device in accordance with a further embodiment.

FIG. 2 shows an embodiment of the sensor device 10, wherein the membrane of the mechanical oscillator 12 is formed to exhibit an edge portion 12a having a protuberance 12b. By means of the edge portion 12a, the mechanical oscillator 12 is fixed, via an insulator, to a fixed electrode 22 in an electrically isolated manner so as to encompass a volume 28. For example, the protuberance of the membrane 12 may be formed by evacuating a volume 28, and/or from the mechanical pre-tension, the surface of the membrane 12 being essentially parallel (in the area of the fixed electrode 22) to a substrate plane. In this context, the membrane 12 is configured to oscillate perpendicularly (i.e. vertically) to the substrate plane. Instead of a membrane comprising a protuberance, a flat membrane or any other shape wherein the mechanical oscillator 12 is arranged at a distance sp 23 (between the insulator 30 and the mechanical oscillator 12) as a movable electrode would also be feasible, for example. As will be described below, said movable electrode may be biased by means of a bias voltage $U_{DC}$ 34 present between the mechanical oscillator 12 and the fixed electrode 22 in order to set the non-linearity. Since the membrane 12 is closed, the volume and/or the cavity 28 below the membrane 12 may be evacuated and/or have an internal pressure $p_i$. A series connection consisting of an alternating voltage source 37, which acts as an excitation unit 14, a direct voltage source 36, which acts as a biasing unit, and a resistor 32 is connected between the fixed electrode and the movable electrode 12 via a contact 24 and/or a contact 26. Via the resistor 32, the opposite end of which may be connected to a mass 33, the evaluation unit 16 may tap the electrical output signal 17 of the mechanical oscillator 12 in the form of a(n alternating) voltage. To this end, the evaluation unit 16 is connected, for example via a line 35, to a node between the direct voltage source 36 and the resistor 32 so as to thus couple the alternating voltage into an RC member.

In this embodiment, the mechanical oscillator 12 is configured as a membrane consisting of polysilicon. The closed form of the mechanical oscillator 12 and/or of the cavity 28 results in advantages during contact of the sensor surface with liquids, so that sticking, in particular, may be avoided. In addition, the closed membrane 12 is mechanically more stable than any self-supporting structure, which enables direct utilization in fields of application which place high requirements in terms of robustness (e.g. in structural-design and supply engineering). The fixed lower electrode 22 may be realized as an implanted electrode. A separate plate consisting of polysilicon, for example, would also be feasible. Said polysilicon plate electrode may be grown onto a sacrificial layer by means of a deposition method, for example. The sacrificial layer may be removed again in a subsequent step by means of etching, e.g. by means of wet-chemical etching using hydrofluoric acid (HF), via etching accesses. The etching accesses may be sealed with, e.g., LPCVD nitride or, generally, with silicon nitride. LPCVD nitride is impermeable to gas, which is advantageous with regard to the hermetically sealed membrane.

In this embodiment it shall be assumed below that the mechanical oscillator 12 is coated with a functional layer (not shown) and that the evaluation unit 16 is configured to determine, on the basis of the jump 20 in the resonance oscillation, a value which depends on a mass of analytes 38 at the functional layer. The functional layer is configured such that, e.g., only analytes of a specific type may adhere to same. The evaluation unit 16 may then determine the adhering mass 38. Examples for this are, e.g., adhesion of antibodies in which only the matching antigens may dock on. Because of the mass of the analytes 38 and the resulting weight on the membrane 12, the mechanical oscillator is detuned, and $f_{jump}$ is shifted, which is exploited in the following process. To determine a value which depends on a mass of analytes 38 at the functional layer, in this embodiment the mechanical oscillator 12 is linearly excited by the excitation unit 14 with an alternating voltage $U_{AC}$ 37. The mechanical oscillator 12 is operated within the non-linear range. The membrane 12 may already be configured such that it is mechanically pre-tensioned; however, it shall be assumed in the following that the biasing unit 36 sets and varies the bias voltage $U_{DC}$ 34 such that a characteristic of the jump 20 in the resonance of the mechanical oscillator 12 is influenced. For applying a bias voltage $U_{DC}$ 34 to the mechanical oscillator 12, an electrical voltage 36 is applied between the fixed electrode 22 and the movable electrode of the mechanical oscillator 12.

The physical connection underlying the embodiments shall be addressed in more detail below: for the derivation, the device is described as an electrostatically driven anharmonic oscillator. The mechanical oscillator 12 is excited by an electrical voltage having a DC portion $U_{DC}$ 36 and an AC portion $U_{AC}$ 37 in the form of:

$$U(t) = U_{DC} + U_{AC} \sin \omega t$$

In this manner, a non-linear exciting electrostatic pressure on the membrane is produced $$P_{el}(t, w) = \frac{\varepsilon \varepsilon_0}{2} \frac{U^2(t)}{2(sp - w(r, t))^2}$$

sp designates the distance 23 (gap without application of external force), w(r,t) designates the bending line (deflection line), wherein r indicates a radial coordinate of an axis of rotation, t indicates the time, and E indicates the relative permittivity (for a sensor filled with vacuum $\varepsilon=1$).

The AC term in the excitation voltage results in a portion of the excitation which has the frequency ω 18, for example in the vicinity of the natural resonance frequency of the mechanical oscillator 12. In addition, the DC component results in a bias voltage $U_{DC}$ 34 of the mechanical oscillator 12 as a result of bending and of a decrease in the distance 23, or the gap, and thus results in a new distance sp-w.

For discussing the properties of the device 10, it is advantageous to describe the mechanical oscillator 12 in a simplified one-dimensional description, which renders the essential physical features, as a non-linear spring/mass system. A realistic description takes into account the complete positional dependence by means of differential operators (e.g. Kirchhoff plate equation).

In the first approximation, the bending line w(r,t) is described, in a simplified manner, as the product of a time-dependent maximum deflection $w_0$ and a function f(r), i.e. $w(r,t)=w_0(t)f(r)$, wherein f(r) describes the relative shape of the bending line. In an ideal plate capacitor, for example, f(r) is constant.

In an axially symmetric sensor, r designates the radial coordinate, but in principle, other, e.g. rectangular, geometries are also possible, of course. Starting from this assumption, the exciting non-linear force may be described as follows:

$$F_{el}(t, w(t)) = \frac{\varepsilon \varepsilon_0}{2} U^2(t) \int \frac{dA}{(sp - w_0(t)f(r))^2}$$

dA is the surface element, sp is the distance 23 of the mechanical oscillator 12 from the insulator 36. The integral extends over the entire area of the movable membrane.

The jump 20 arises in the resonance curve of a micromechanical element on the basis of the non-linear dependence of the driving "electrostatic" force $F_{el}(t,w)$ on the deflection w or on the basis of a non-linear dependence of the mechanical restoring force $F_R(w)$ of the micromechanical element on the deflection w(r,t). For a plate, the following shall apply in terms of approximation, for example:

$$F_r = k_{eff} w + k_{NL} w^3 +$$

The non-linear dependence of the spring force which is designated here by the coefficients $k_{nl}$ results in a frequency shift Δf toward higher frequencies ("spring hardening"). The semi-empirical motion equation results in:

$$m_{eff} \frac{d^2}{dt^2} w_0 + \lambda \frac{d}{dt} w_0 + k_{eff} w_0 + k_{NL} w_0^3 + \ldots = F_{el}(t, w)$$

In this equation, $m_{eff}$ signifies the effective mass, λ signifies the attenuation constant (e.g. due to an acoustic energy output to a surrounding medium), and $k_{eff}$ signifies the effective spring constant. The electrostatic excitation force may be conceived, as a rough approximation, as having been developed by a power series in powers of $w_0$.

$$F_{el}(t,w) = F_{el}^0(t) + \alpha w_0(t) + \beta w_0^2(t) + \gamma w_0^3(t) + \ldots + \text{"correction}(w,t)\text{"}$$

Thus, in addition to the linear "spring force" $k_{eff} w_0$ (with an effective spring constant $k_{eff}$) and a linear contribution $\alpha$ of the electrostatic force, which contribution leads to a shift in the resonance toward smaller frequencies, "spring softening", said non-linear force components lead to further non-linear terms, namely $\beta w_0^2 + \gamma w_0^3 + \ldots$. The non-linear coefficients $\beta, \gamma, \ldots$ again depend on the excitation parameters, i.e. on the DC voltage $U_{DC}$ 36 and the AC voltage $U_{AC}$ 37.

To determine, with high accuracy, a value dependent on a mass of analytes 38 at the functional layer, the frequency shift $\Delta f$ of the jump 20 in the resonance oscillation in the output signal 17 is detected by the evaluation unit 16. The evaluation unit 16 is configured to detect the jump 20 by means of an electrical quantity at a movable electrode of the mechanical oscillator 12 and/or at a fixed electrode 22 opposite the moved electrode. To this end, the resonance oscillation is tapped as an electrical output signal 17 via the resistor 32 by the evaluation unit 16. The connection between the frequency shift $\Delta f$ of the jump 20 in the resonance oscillation and the value to be determined of a mass of analytes 38 at the functional layer will be described in more detail in FIGS. 3, 6 and 7.

As an alternative to determining a value which depends on a mass of analytes 38, the sensor device 10 may be used to determine a value dependent on a pressure difference, since bending of the membrane 12 due to an external pressure will also lead to a frequency shift $\Delta f$ of the jump 20. To this end, the mechanical oscillator 12 is configured as a membrane which encloses an internal volume 28 on its inner surface, and the evaluation unit 16 is configured to determine, on the basis of the jump 20 in the resonance oscillation, a value which depends on a pressure difference, acting on the membrane 12, between the inner surface and the outer surface. Just like in the above-mentioned embodiment, the pressure applied to the outer surface of the membrane 12 detunes the mechanical oscillator 12 in the resonance oscillation by means of a force which is analogous to the weight due to mass of analytes 38, so that the pressure acting upon the membrane 12 may be determined by using such a sensor device 10 and an analogous method. This frequency shift $\Delta f$ may also be determined at high speed in this alternative embodiment. The sensor device 10 may be used, in particular, for low pressures within the vacuum range up to ultrahigh vacuum (UHV). For high pressures and/or media having strong attenuating effects, it is advantageous to decouple the pressure coupling to the oscillating membrane 12 by a separate housing 96 and a separate outer membrane 94, as is described in FIG. 12.

As an alternative to tapping the electrical output signals 17 via the resistor 32 by the evaluation unit 16, other tapping points, e.g. directly on the mechanical oscillator 12, would also be feasible.

In addition, it would also be possible not to detect the mechanical oscillation of the mechanical oscillator 12 via an electrical output signal, but to detect same by means of an optical or acoustic sensor, for example. Likewise, in terms of excitation it would also be feasible to excite mechanical oscillation of the mechanical oscillator purely mechanically, for example, or by means of sound waves, rather than electrostatically.

Figure 3:
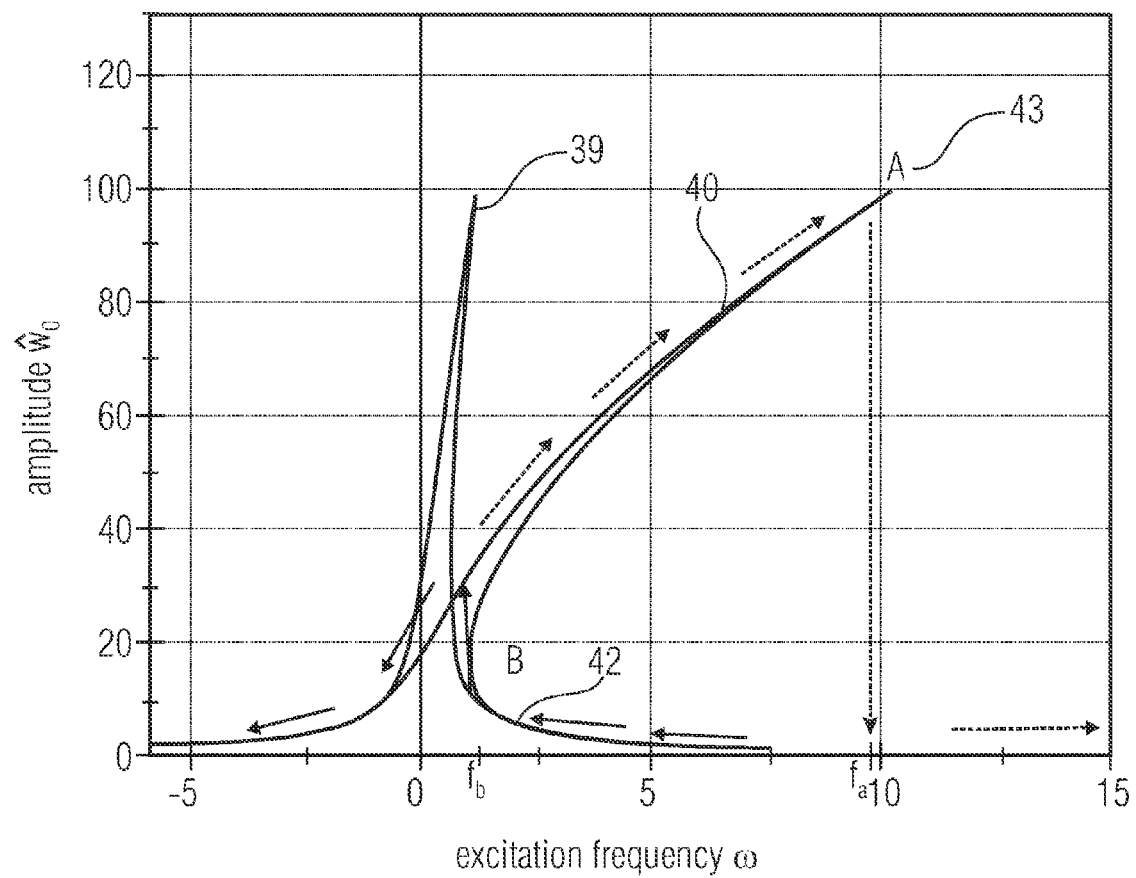
FIG. 3 shows a schematic representation of theoretical resonance curves of a sensor device in accordance with FIG. 1 for different anharmonicities.

FIG. 3 shows the schematic representation of theoretical resonance curves of an analytical model of a mechanical oscillator 12 for two different anharmonicities 39 and 43, produced, e.g., by different bias voltages $U_{DC}$ 34 of the mechanical oscillator 12 which arise from non-linear force components as are described in FIG. 2. What is shown is in particular the change in the amplitude of oscillation $\hat{w}_0$ in dependence on the excitation frequency $\omega$ in arbitrary units. In this representation, two anharmonicities are depicted; in the following, only the anharmonicity 43 having the highly characteristic tilting phenomenon shall be addressed, said tilting phenomenon arising, for example, from a bias voltage $U_{DC}$ 34 being higher than the bias voltage $U_{DC}$ 34 of the anharmonicity 38.

Due to the curvature of the resonance profile, there is a frequency range between the frequency $f_a$ and the frequency $f_b$ with three possible solutions for the amplitude of oscillation $\hat{w}_0$. However, of the multi-valued solutions, only one will be stable in each case, since the resonance profile forms a hysteresis. Since the development of the anharmonicity depends on the excitation frequency $\omega$ 18 and a scan direction, the excitation unit 14 is configured to vary the excitation frequency $\omega$ 18. In this case, the amplitude of oscillation $\hat{w}_0$ is dependent on the variable excitation frequency $\omega$ 18 and, in particular, on the scan direction, i.e. on whether the mechanical oscillator 12 is excited with an increasing or a decreasing excitation frequency $\omega$ 18. With increasing excitation frequency $\omega$ 18, the upper branch 40 of the resonance profile will be stable; within said branch, the amplitude of oscillation $\hat{w}_0$ will rise up until a point A and drop abruptly at A, as a result of which the steep jump 20 in the resonance oscillation will be created. With decreasing excitation frequency $\omega$ 18, the amplitude of oscillation $\hat{w}_0$ will initially follow the bottom branch 42 and then increase abruptly in point B, so that, again, a jump 20 in the resonance oscillation will be created.

As an alternative to the resonance curves which in this schematic representation are bent toward the right, it is also possible for the curved to be bent toward the left. This depends on the relative sizes of the non-linear coefficients ($K_{NL}, \beta, \gamma, \ldots$).

The not highly characteristic anharmonicity 39 arises, for example, in the event of a bias voltage $U_{DC}$ 34, which is lower than the highly characteristic anharmonicity 43, by the biasing unit as a result of a lower direct voltage 36.

Figure 4:
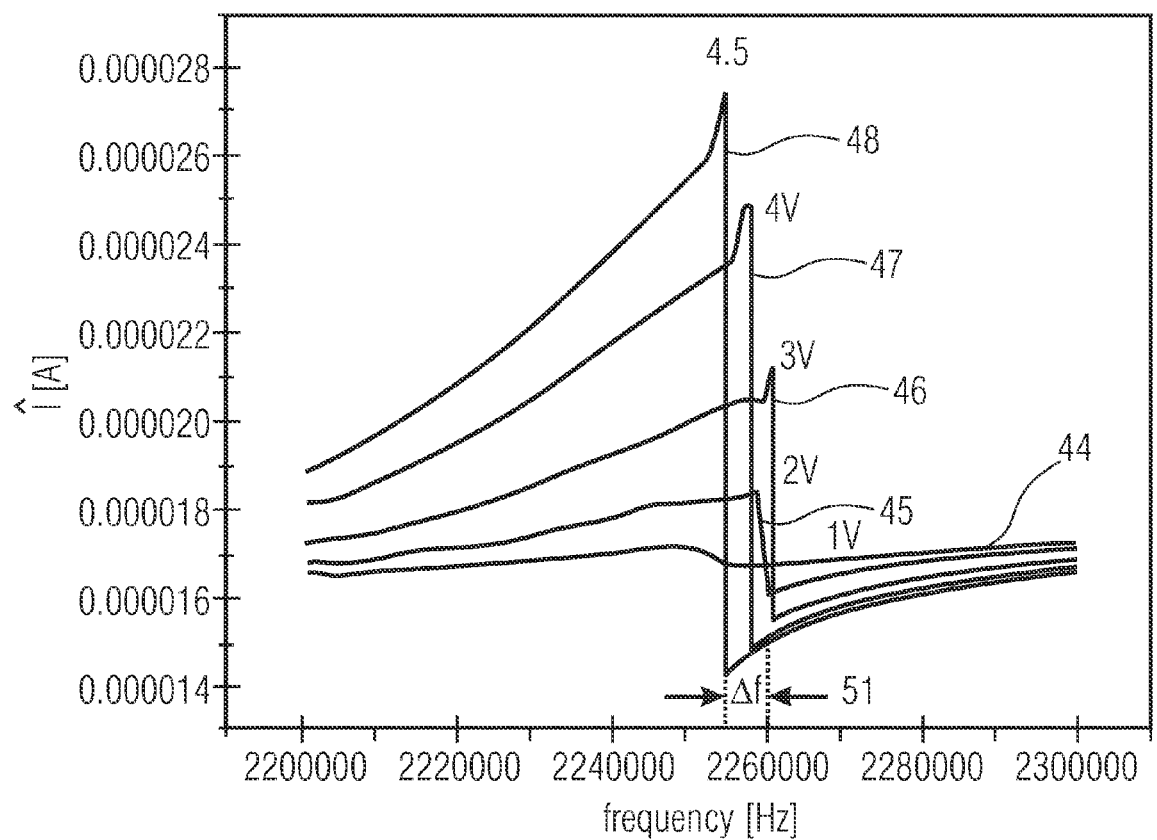
FIG. 4 shows a schematic representation of a calculated spectrum of the sensor device of FIG. 2 for various bias voltages $U_{DC}$.

FIG. 4 shows the connection in accordance with a numerical calculation between the bias voltage $U_{DC}$ 34 and the characteristic of the jump 20 in the resonance for five different characteristics 44, 45, 46, 47, and 48 of jumps 20 in the resonance as a result of five different bias voltages $U_{DC}$ 34. What is depicted is, in particular, five different dependencies or graphs 44, 45, 46, 47, and 48 of the amplitude of the electrical current in dependence on the excitation frequency $\omega$ 18 with which the mechanical oscillator 12 is excited, for example, by an alternating voltage $U_{AC}$ of 0.5 V. An excitation frequency $\omega$ 18 is advantageously selected to be within the range of several MHz (e.g. 0.5 MHz to 20 MHz or 5 MHz to 100 MHz or to 1 GHz), which has the advantage of entailing a higher frequency resolution since the mass resolution is proportional to the frequency. In this example, the membrane has a diameter D of 84 µm, a thickness of 1 µm and an attenuation factor Q of 200. However, smaller diameters D are also possible for achieving a higher frequency resolution, but at the expense of the excitation voltage that may be used. The biasing unit 36 is configured to vary a bias voltage $U_{DC}$ 34 of the mechanical oscillator 12 such that a characteristic 44, 45, 46, 47, and 48 of the jump 20 in the resonance of the mechanical oscillator 12 is affected. Three different characteristics 44, 46, and 48 of jumps 20 in resonance oscillation of mechanical oscillators will be explained below by way of example:

Graph 44 shows a slightly biased mechanical oscillator 12 which is biased, with the bias voltage $U_{DC}$ 34 amounting to 1

V DC, by the biasing unit 36 by means of an electrical voltage between the fixed electrode 22 and the movable electrode of the mechanical oscillator 12. The steady curve may be seen in graph 44, so that, given this characteristic 44, no jump 20 will arise in the resonance oscillation. In graph 46, the bias voltage $U_{DC}$ 34 of the mechanical oscillator 12 is varied, by the biasing unit 36, such that the anharmonicity and thus the jump 46 in the resonance oscillation arise. Here, the mechanical oscillator 12 is biased by the biasing unit 36 by means of a higher direct voltage, for example a bias voltage $U_{AC}$ 34 amounting to 3 V DC. The characteristic 46 of the jump 20 in the resonance oscillation may be varied by the intensity of the bias voltage $U_{DC}$ 34 with which the biasing unit biases the mechanical oscillator 12. As compared to graph 46, graph 48 shows a more pronounced characteristic 48 of the jump 20 as well as a frequency shift $\Delta f$ 51. In graph 48, the mechanical oscillator 12 is biased, by the biasing unit 36, with a higher bias voltage $U_{DC}$ 34 (as compared to the bias voltage $U_{DC}$ 34 in graph 46), for example with 4.5 V.

Alternatively, further mechanisms for biasing, which in the embodiments is described as an electrostatic force due to an electrical voltage between the movable and the fixed electrodes, such as a purely mechanical pre-tension, for example, would also be feasible.

Figure 5:
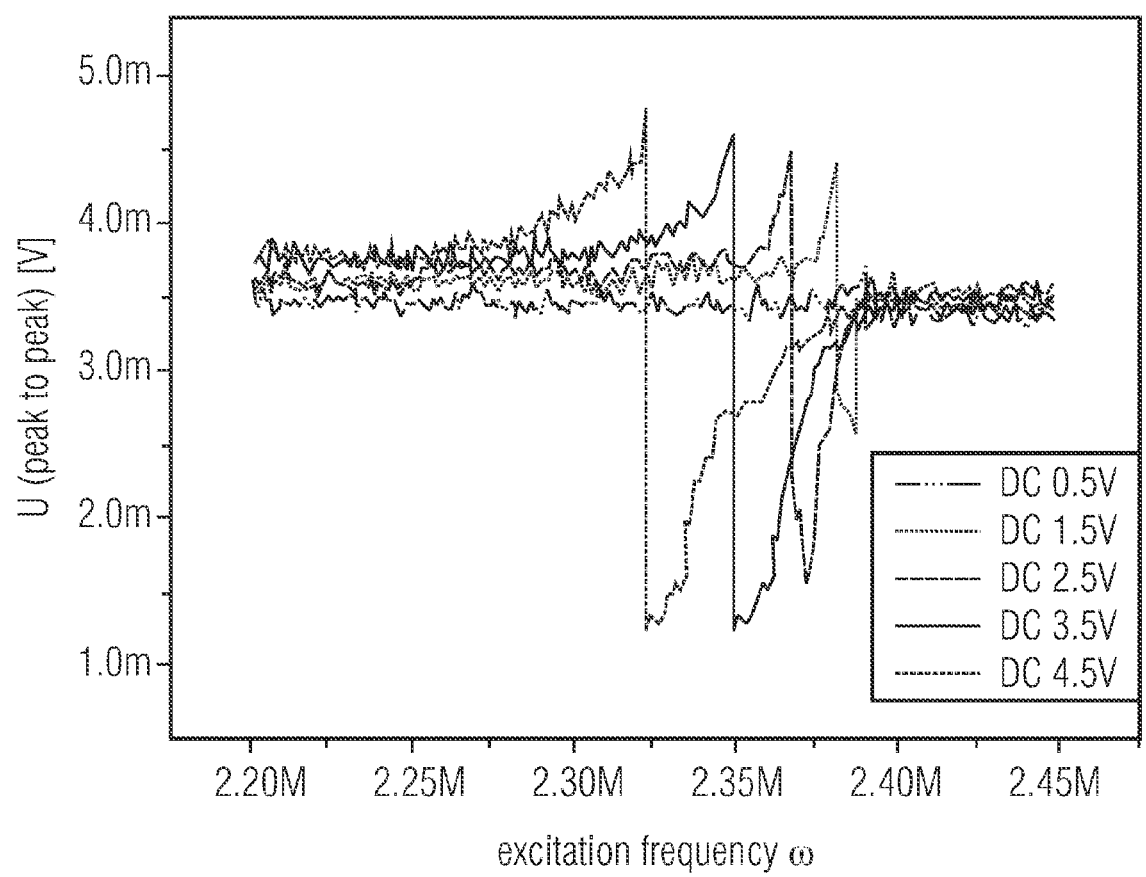
FIG. 5 shows graphs for illustrating the variation of the calculated spectrum in dependence on the bias voltage $U_{DC}$.

FIG. 5 shows a schematic representation of an exemplary measuring result with the inventive sensor device 10. In this series of tests and simulations, the bias voltage $U_{DC}$ 34 of the biasing unit 36 was changed step by step by varying the electrical voltage, and thus different characteristics of the jumps 20 in the resonance oscillations of the mechanical oscillator 12 were created. In this test series, the mechanical oscillator 12 was excited with an alternating voltage $U_{AC}$ of 0.5 V, the excitation frequency ω 18 having been increased in steps of 1 kHz. The influence of the attenuation λ on the characteristic of the jump 20 was also identified in the tests and/or simulations. In particular, while using small attenuations λ, a steep jump 20 in the resonance oscillation of the mechanical oscillator 12 is formed. Conversely, the sensor device 10 may also be used while setting the excitation parameters (ω, $U_{DC}$, ... ) with a high attenuation λ, such as under atmospheric pressure or in liquids.

Figure 6:
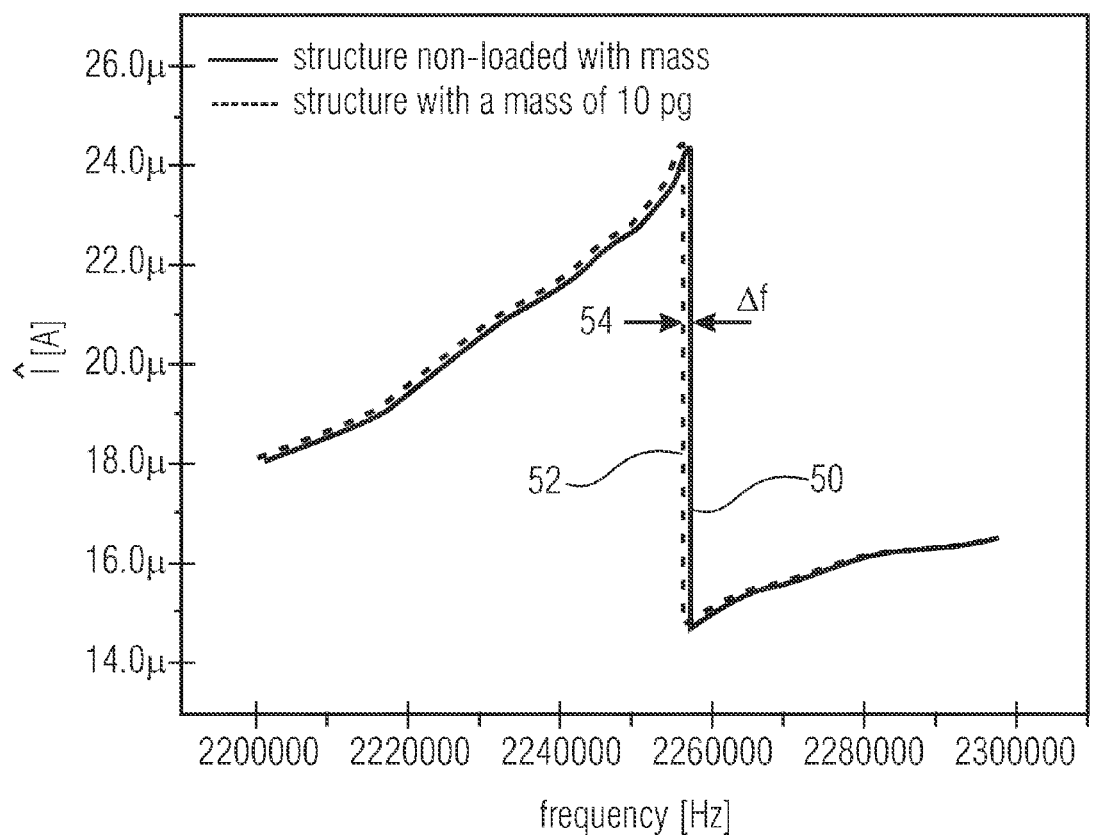
FIG. 6 shows a calculated frequency spectrum of a sensor device in accordance with FIG. 2 for a membrane having a diameter D=84 μm, in one case non-loaded with mass (continuous line), and in one case having an additional mass of 10 pg (dashed line)

FIG. 6 shows the comparison (numerical calculation) of a jump 50 (continuous line) in the resonance oscillation of a non-loaded mechanical oscillator 12, and of the jump 52 (dashed line) in the resonance oscillation of an oscillator 12 loaded with 10 pg in dependence on the frequency f and the amplitude of oscillation Î. The schematic representation shall be based on the assumption of an excitation frequency ω 18 tuned in steps of 100 Hertz, i.e. the excitation frequency ω 18 was changed, step by step, by steps of 100 Hz in the scan direction. In addition, for this exemplary calculation, a polysilicon membrane having a diameter of 84 µm and a thickness of 1 µm was assumed. For the attenuation λ, a Q factor of 200 was assumed. The effective spacer thickness sp 23 is 250 nm. For the relative shape of the membrane of the mechanical oscillator 12, a parabolic profile f(r) is assumed for the bending line of the membrane. The mechanical oscillator 12 is biased with an electric bias voltage $U_{DC}$ 34 amounting to 4 V by the biasing unit 36. The excitation unit 14 excites the membrane by the alternating voltage source 37 with 0.5 V AC. The results of the exemplary calculation under the above-mentioned boundary conditions are depicted in FIG. 6 for a non-loaded membrane, jump 50 (continuous line) and a membrane loaded with 10 pg, jump 52 (dashed line). To determine the frequency shift $\Delta f$ 54, the exact frequencies of the jumps 50 and 52 are detected in the evaluation unit 16. To this end, the evaluation unit 16 is configured to detect the jumps 50 and 52 in the resonance oscillation, while the excitation frequency ω 18 is being varied, by means of a peak value in the amplitude of oscillation Î of the mechanical oscillator 12.

The frequency shift $\Delta f$ 54 of the jump (50 to 52) serves as a measure of the effect to be measured—in this case of the loading with additional mass $\Delta m$ 38, e.g. 10 pg. The loading with additional mass $\Delta m$ 38 is related via the following equation to the frequency shift $\Delta f$ 54 to be measured:

$$\Delta f \cong 1/2 \frac{f_0}{M} \Delta m$$

Here, $f_0$ signifies the resonance frequency, M signifies the entire mass of the oscillating system, including the mass of the mechanical oscillator 12. From this relationship it becomes clear that a high resonance frequency $f_0$ will lead to a large frequency shift $\Delta f$ 54. High resonance frequencies may be achieved, e.g., by small membrane diameters. However, in this case a higher excitation voltage $U_{AC}$ of the alternating voltage source 37 may be used for the excitation unit 14. For evaluating the resonance profile it is advantageous to use the differential spectrum, i.e. one evaluates one signal quantity that is proportional to the change in amplitude (or, alternatively, phase change) per frequency interval. This differential spectrum then will then show needle-like peaks at the positions of the jumps 50 and 52. The mass $\Delta m$ 38 additionally applied to the membrane 12 may be concluded from the frequency shift $\Delta f$ 54 of the jumps 50 and 54. As a result, a very high resolution is possible.

Figure 7:
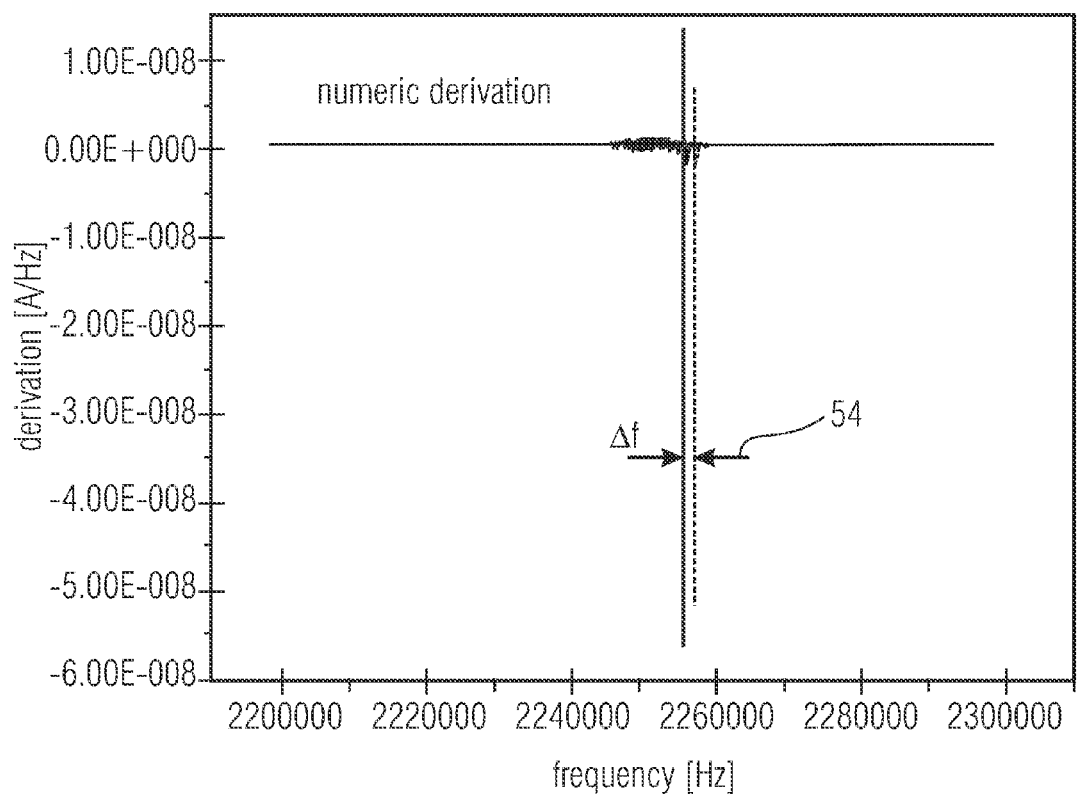
FIG. 7 shows a numeric derivation of the calculated frequency spectrum of FIG. 6.

FIG. 7 shows the schematic representation of the numerical derivation of the resonance profile shown in FIG. 6. The frequency shift $\Delta f$ 54 is depicted in this schematic representation by means of the needle-like differential spectrum of the jumps 50 and 52 shown in FIG. 6.

To determine the jumps 50 and 52, the evaluation unit 16 is configured to detect the jump 50 and/or 52 in the resonance oscillation, while the excitation frequency ω 18 is being varied, by means of a peak value in the amplitude of oscillation Î or a phase change in the resonance oscillation of the mechanical oscillator 12. Alternatively, it is also possible for the evaluation unit 16 to detect the jump 50 and/or 52 in the resonance oscillation by means of a phase change in the resonance oscillation of the mechanical oscillator 12.

Figure 8:
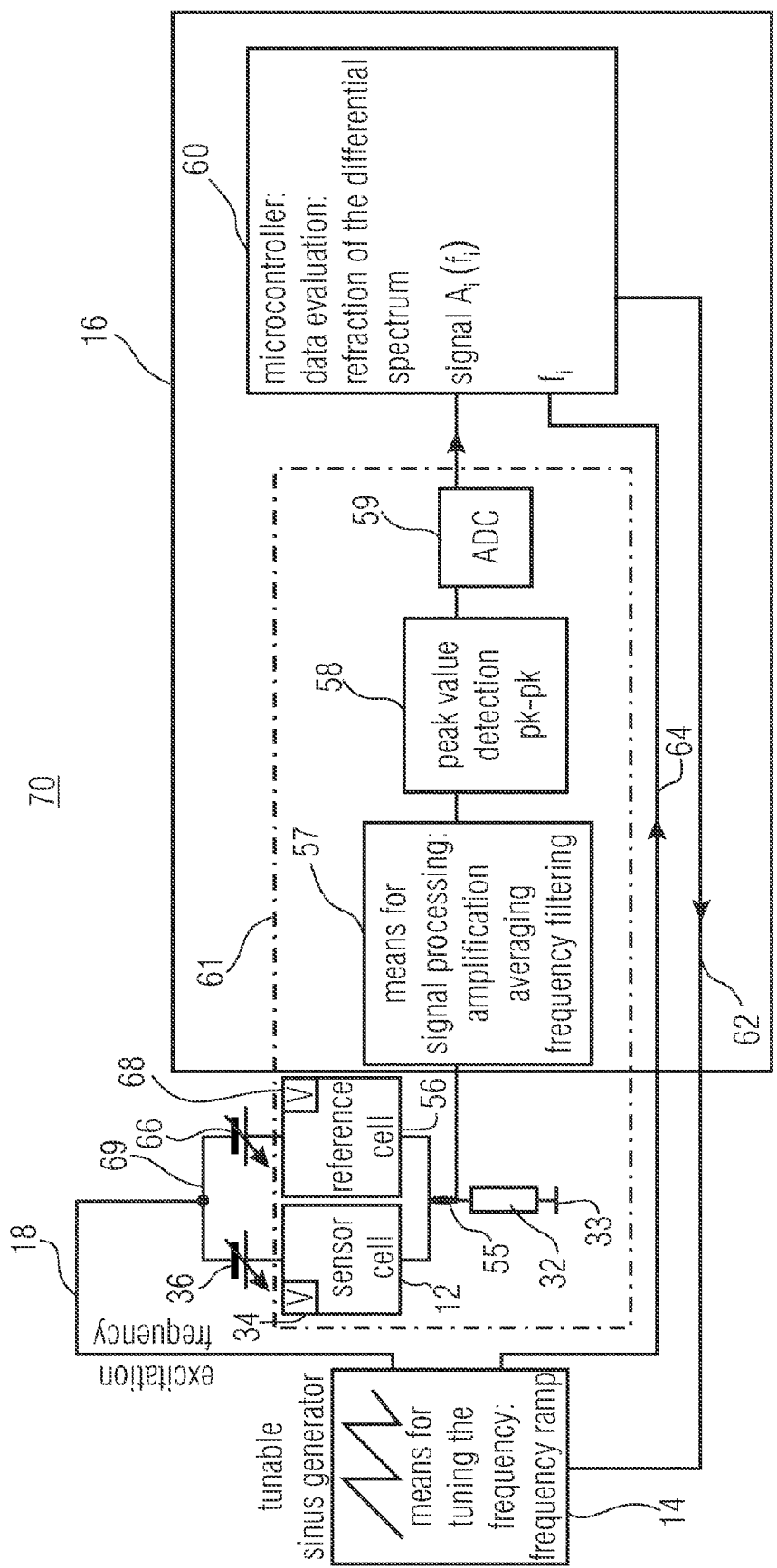
FIG. 8 shows a block diagram of a sensor device in accordance with a further embodiment.

FIG. 8 shows the device 70 in accordance with an embodiment, comprising an additional mechanical reference oscillator 56 connected in parallel to the mechanical oscillator 12. In terms of its characteristics, the mechanical reference oscillator 56 may have the same physical properties as the mechanical oscillator 12, for example in terms of material, temperature range, bending (deflection), shape and mass. The reference oscillator is configured such that it is largely insensitive to signals, i.e. in the case of a mass sensor, for example, will have no functional layer to which analytes may dock. In this representation, the two mechanical oscillators are depicted as a block diagrams for the mechanical oscillator 12—sensor cell—and for the mechanical reference oscillator 5—reference cell. Therefore, it shall be assumed below, by way of example, that the mechanical oscillators 12 and 56 in principle correspond to the setup shown in FIG. 2, the mechanical oscillators 12 and 56 being connected, as the movable electrode, with the node 69 by a biasing unit 36 and 66, respectively, of their own to the node 69, and the fixed electrode, which is located opposite the respective mechanical oscillator 12 and 56, is connected to a node 55.

For the mechanical reference oscillator 56, for generating the bias voltage $U_{AC}$ 68, a biasing unit in provided in the form of an adjustable direct voltage source 66, for the mechanical oscillator 12, the biasing unit 36 is provided in the form of a direct voltage source 36. These two biasing units 36 and 66 in the parallel connection may apply a bias voltage $U_{AC}$ 34 and 68 for the respective mechanical oscillator in relation to that node 55 of the two mechanical oscillators which is connected to the mass 33 via the resistor 32. Both of the mechanical oscillators 12 and 56 connected in parallel are connected to the excitation unit 14 via the common node 69, so that said excitation unit 14 may excite both mechanical oscillators 12 and 56 with an excitation frequency ω 18.

The evaluation unit 16 is connected to the mechanical oscillator 12 and the mechanical reference oscillator 56 via the node 55, so that the currents added in the node 55 and having the amplitude of oscillation $\hat{I}$ of the mechanical oscillators 12 and 56 may be tapped as a voltage by the evaluation unit 16 via the resistor 32. The evaluation unit 16 includes means for signal processing 57, including amplification, averaging, offset correction and filtering, peak-value detection 58, analog/digital conversion 59 as well as a differential data evaluator 60. These elements process the signal, added at the node 55, of the two mechanical oscillators 12 and 56 in the sequence shown. In addition, the differential data evaluator 60 of the evaluation unit 16 is connected to the excitation unit 14 via a control channel 62 and an information channel 64.

Thus, the device 70 additionally comprises the mechanical reference oscillator 56, and the excitation unit 14 is configured to excite the mechanical reference oscillator 56 and the mechanical oscillator 12 via the node 69 to perform mechanical oscillation within the non-linear range at a varying excitation frequency ω 18 of the mechanical oscillator 12, the excitation unit 14 being controlled via the evaluation unit 16 by means of the control channel 62. In order to operate the two mechanical oscillators within a non-linear range, a biasing unit 36 for the mechanical oscillator 12 and a biasing unit 68 for the mechanical reference oscillator 56 are configured to set the bias voltages $U_{DC}$ 34 and 68 such that a characteristic of the jump in the resonance oscillation of the mechanical oscillator and a characteristic of the jump in the resonance oscillation of the mechanical reference oscillator are mutually balanced out and equal in size. The characteristic of the jump is understood to mean, for example, the unsteady curve of a resonance profile at an excitation frequency ω 18, which in an ideal case has a high peak-peak difference in its amplitude of oscillation $\hat{I}$, as is explained in more detail in FIG. 6 and FIG. 7. The bias voltages $U_{DC}$ 34 and 68 for the mechanical oscillator 12 and for the mechanical reference oscillator 56 are set via the biasing units 36 and 66, which are configured to apply, to achieve the bias voltages $U_{DC}$ 34 and 68, an electrical voltage between the fixed electrode and the movable electrode of the respective mechanical oscillator. The biasing units may be configured to vary the bias voltage $U_{DC}$ 68 of the mechanical reference oscillator 56 and a bias voltage $U_{DC}$ 34 of the mechanical oscillator 12 such that a characteristic of the jump 20 in the resonance oscillation of the mechanical reference oscillator 56 is balanced out as compared to the characteristic of the jump 20 in the resonance oscillation of the mechanical oscillator 12, for example in terms of the jump frequency $F_{jump}$ and in terms of the amplitude of oscillation $\hat{I}$ in the jump. In this embodiment, two separately adjustable electrical voltage sources 36 and 66 are provided, which adjust the bias voltages $U_{DC}$ 34 and 68 of the mechanical oscillator 12 and of the mechanical reference oscillator 56. As a result of the balanced-out bias voltages $U_{DC}$ 34 and 68 of the two mechanical oscillators 12 and 56, of the identical excitation frequency ω 18 and of the similarity of the oscillators 12 and 56, the mechanical oscillators 12 and 56 perform, in the non-loaded state, an identical mechanical oscillation with an identical characteristic of the jump in the resonance ($\Delta f=0$).

The evaluation unit 16 is configured to perform a differential evaluation 60 between the position of the jumps in the resonance oscillation of the mechanical oscillator 12 and a resonance oscillation of the mechanical reference oscillator 56. In this case, the evaluation unit 16 compares the jumps 20 in the resonance oscillations of the mechanical oscillator 12 and of the mechanical reference oscillator 56, while the excitation frequency ω 18 is varied, in a differential manner by means of peak values in amplitudes of oscillation $\hat{I}$ or by means of phase changes in the resonance oscillations. The comparison is performed in the differential data evaluator 60; in this embodiment, the added currents having the amplitude of oscillation $\hat{I}$ of the two mechanical oscillators 12 and 54, which may be tapped as a voltage via the resistor 32, are processed. This purpose is served by the means for signal processing, amplification, averaging, offset correction and filtering 57, peak-value detection 58 as well as analog/digital conversion 59. Said peak-value detection 58 determines the jumps by means of peak-peak values $A_i$, for example by means of the numeric derivation. In peak-value detection 58, it is possible to detect, with reference to FIG. 9, a jump, for example graphs 74 or 76, of a mechanical oscillator 12 and the frequency of a jump, for example graph 72, of a mechanical reference oscillator 56, and to convert it into a digital value by means of analog/digital conversion 59. The differential data evaluator 60 reads in the digital value of the peak values (peak-peak $A_i$) of the peak-value detection 58 along with the frequency ($f_i$), which belongs to the jump 20, via the information channel 64 and forms the numeric differential quotient for calculating the differential spectrum. To this end, the evaluation unit 16 and in particular the differential data evaluator 60 of the evaluation unit 16 is configured to determine the frequency difference Δf, for example 78 or 80, of the frequency of the jump in the graphs 74 or 76 in the mechanical oscillation of the mechanical oscillator 12 from the frequency of the jump in the graph 72 in the mechanical oscillation of the mechanical reference oscillator 56. In the differential comparison of the jumps in the graphs 74 and 76 with the jump in the graph 72, a frequency difference Δf 78 and/or 80 may be determined, on the basis of which, for example, a mass 38 or pressure difference with which the mechanical oscillator 12, also referred to as a sensor cell, is loaded as compared to the mechanical reference oscillator 56, are calculated.

The precise method of determining a value depending on a quantity to be measured will be explained in more detail in FIG. 9.

In this embodiment, the differential data evaluator 60 of the evaluation unit 16, or referred to as a readout unit, may be configured as a microcontroller and may also vary the excitation frequency ω 18 via the control channel 62 and the information channel 64. In this manner it is possible to excite the mechanical oscillator 12 with excitation frequencies ω 18 within a range by means of a frequency scan wherein the jump in the resonance oscillation of the mechanical oscillator 12 is reliably located.

As an alternative to depicting the excitation frequency ω 18 via the information channel, frequency determination in the evaluation unit 16 would also be feasible.

Alternatively, an external arithmetic unit, a CPU, a computer program or a display device may also be used, for the differential data evaluator 60, for manual data evaluation.

As an alternative to detecting the jumps in the graphs 72, 74 and 76 in the resonance oscillation by means of a peak-value detection 58, a detection of the jumps in the graphs 72, 74 and 76 by means of a phase change in the resonance curves of the mechanical oscillators 12 and/or 56 would also be feasible in this embodiment. A phase-sensitive lock-in technique may be advantageously used for evaluating the jump 20, for example.

An alternative embodiment of the described sensor device 70 is to produce an application-specific integrated circuit (ASIC) on a structural component 61, having the following constituents: mechanical oscillator 12, mechanical reference oscillator 56, resistor 32, signal processing means, amplification, averaging and frequency filtering 57, peak-value detection 58, and analog/digital conversion 59. It is also possible for said ASIC to contain the excitation unit 14.

As an alternative to connecting the mechanical oscillators 12 and 56 with their fixed electrodes between nodes 69 and 55, modified wiring of the mechanical oscillators 12 and 56 would also be feasible. Also, it is obvious to a person skilled in the art that the biasing units 36 and 66 need not necessarily be arranged between the node 69 and the mechanical oscillator 12 or 56, respectively, but might also be arranged between the mechanical oscillator 12 or 56, respectively, and the node 55, for example. It would also be feasible to have a circuit comprising a biasing unit for both mechanical oscillators 12 and 56 and a biasing unit for zero balancing.

As an alternative to the mechanical reference oscillator 56, which is similar to the mechanical oscillator 12 in terms of physical properties, a different mechanical reference oscillator 56 may also be used, which exhibits, for example, a similar behavior toward the mechanical oscillator 12, for example due to adaptation of the bias voltage.

Figure 9:
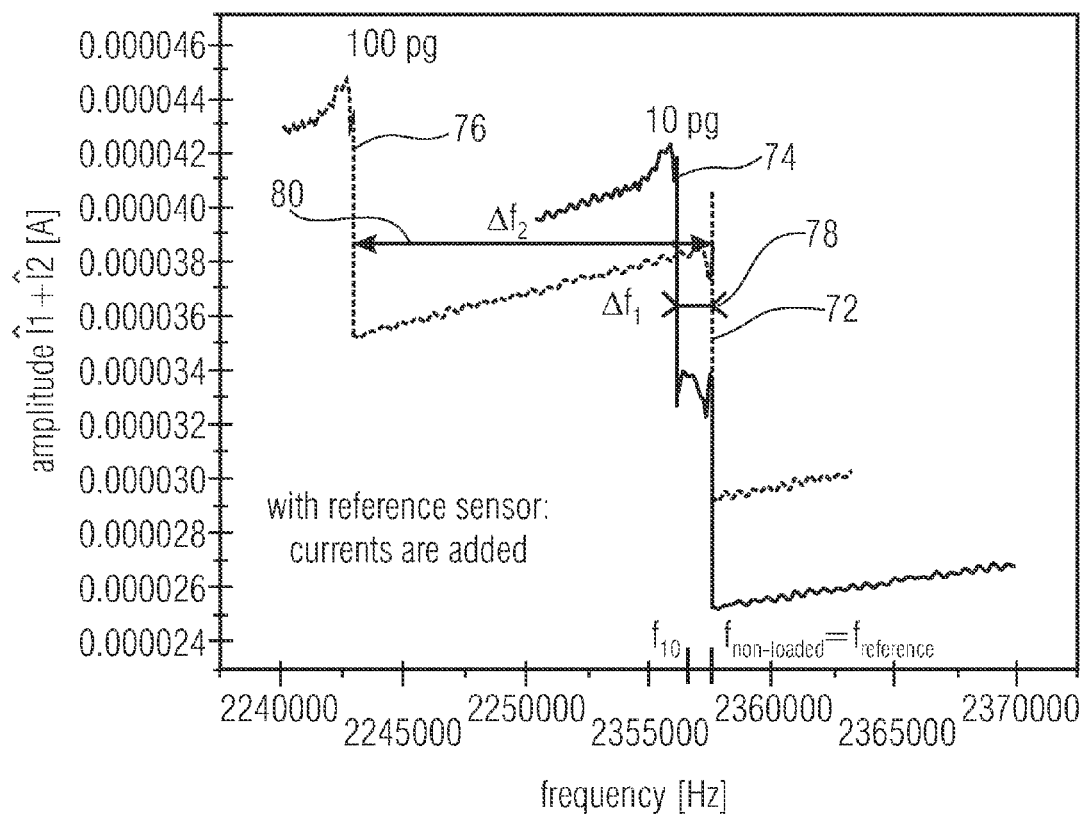
FIG. 9 shows a calculated spectrum for the added-up output signal of a mechanical oscillator and of a mechanical reference oscillator in accordance with FIG. 8 for different force assignments of the mechanical oscillator.

FIG. 9 shows the amplitude of the currents, added up in an in-phase manner, of the mechanical oscillator 12 and of the mechanical reference oscillator of a device 70 in dependence on the frequency f and the amplitude of oscillation Î (numerical calculation). In this context, a graph 72 comprising a jump of the mechanical reference oscillator 56, a graph 74 comprising a jump of a mechanical oscillator 12 loaded with 10 pg, and a graph 76 comprising a mechanical oscillator 12 loaded with 100 pg are depicted.

In addition, a frequency shift $\Delta f_1$ 78 between the jump in the graph 72 and the jump in the graph 74 for a load of 10 pg on the mechanical oscillator 12, as well as a frequency shift $\Delta f_2$ 80 between the jump of the graph 72 and the jump of the graph 76 for a load of 100 pg on the mechanical oscillator 12 are visualized. In the combined spectrum of the amplitudes of the currents added up in an in-phase manner, the mass difference $\Delta m$ 38 may be read from the frequency shifts $\Delta f_1$ 78 and $\Delta f_2$ 80 and/or from the distance of the jumps.

Generally, the following approach is used in the sensor device/device 70 for determining a value which depends on a mass of analytes 38 at the functional layer:

In the first step, the excitation parameters for the sensor device 70 are set. To this end, while using the evaluation unit 16 and in particular while using the differential data evaluation 60, a frequency range is selected for the excitation frequency ω 18 within which the mechanical oscillator 12 and the mechanical reference oscillator 56 exhibit non-linear behavior. Within this non-linear range, the bias voltage $U_{DC}$ 34 of the mechanical oscillator 12 is set, with the aid of the biasing unit 36, and the bias voltage $U_{DC}$ 68 of the mechanical reference oscillator 56 is set, with the aid of the biasing unit 66, such that a pronounced characteristic of the jump 20 in the resonance oscillation of the mechanical oscillator 12 and of the mechanical reference oscillator 56 arises. To this end, the bias voltages $U_{DC}$ 34 and 68 are adapted, with the aid of the electrical voltage source 36 and the electrical voltage source 66, for such time until the evaluation unit 16 detects a steepness of the jump in the graph 72 in the resonance profile of both mechanical oscillators 12 and 56 while the excitation frequency ω 18 is varied, within the frequency range selected, either with increasing frequency or with decreasing frequency. Finding this setting need not necessarily be repeated in each measurement. In the next step, the bias voltage $U_{DC}$ 34 of the mechanical oscillator 12 and/or the bias voltage $U_{DC}$ 68 of the mechanical reference oscillator 56 are adjusted, with varying excitation frequency ω 18, while using the electrical voltage source 36 and/or while using the electrical voltage source 66, such that the characteristic of the jump in the graph 72 in the resonance oscillation of the mechanical oscillator 12 is balanced out as compared to the characteristic of the jump in the graph 72 in the resonance oscillation of the mechanical reference oscillator 56; in other words, such that the frequency difference between the jumps of the two mechanical oscillators 12 and 56 is eliminated. This balancing takes place without the mechanical oscillator 12 being loaded with a mass $\Delta m$ 38 or a pressure, for example. However, this balancing is not absolutely necessary; alternatively, a comparison of the spectrum as was "before", without loading by analytes, with the spectrum as was "after", with loading by analytes, would be possible.

In the second step, the mass of analytes 38 that is to be determined is measured. In this embodiment it shall be assumed that the analytes may dock onto the functional layer of the mechanical oscillator 12, loading with the mass of analytes 38 on the mechanical reference oscillator 56 not being possible since the mechanical reference oscillator 56 is realized in a manner such that it is not functionalized, i.e. that it is not provided with a functional layer. During measurement, the mechanical oscillator 12, which in the non-loaded state exhibits a jump (cf. graph 72) at the frequency $f_{non-loaded}$ and/or the frequency $f_{reference}$, is loaded with a mass of analytes 38, for example 10 pg, which may dock onto the functional layer of the mechanical oscillator 12. Due to this loading with mass $\Delta m$ 38, the mechanical oscillator 12 is detuned, as a result of which the jump in the resonance profile of the mechanical oscillator 12 undergoes a frequency shift $\Delta f_1$ 78, and the mechanical oscillator 12 now forms the jump in the graph 74 at the frequency $f_{10}$. For example, the evaluation unit 16 may detect, in the added output signal of the two mechanical oscillators 12 and 56, by means of the peak value detection 58, the jump in the graph 72 of the mechanical reference oscillator 56 and the jump in the graph 74 of the mechanical oscillator 12 loaded with 10 pg. The differential data evaluation 60 of the evaluation unit 16 determines the frequency shift $\Delta f_1$ 78 on the basis of the peak values detected and of the frequencies $f_{reference}$ and $f_{10}$, and it may infer the loading with mass $\Delta m$ 38 from the relationship $$\Delta f \cong 1/2 \frac{f_0}{M} \Delta m.$$

Alternatively, this method may also be used to determine a pressure difference between a pressure applied to the membrane of the mechanical oscillator 12 and a pressure applied to the membrane of the mechanical reference oscillator. In this context it is useful to subject the membrane of the mechanical reference oscillator 56 to the ambient pressure while subjecting the membrane of the mechanical oscillator 12 to the pressure to be measured.

As an alternative to decoupling the mechanical reference cell 56 by means of a non-functionalized membrane, encapsulation of the reference oscillator 56 would also be possible.

Figure 10:
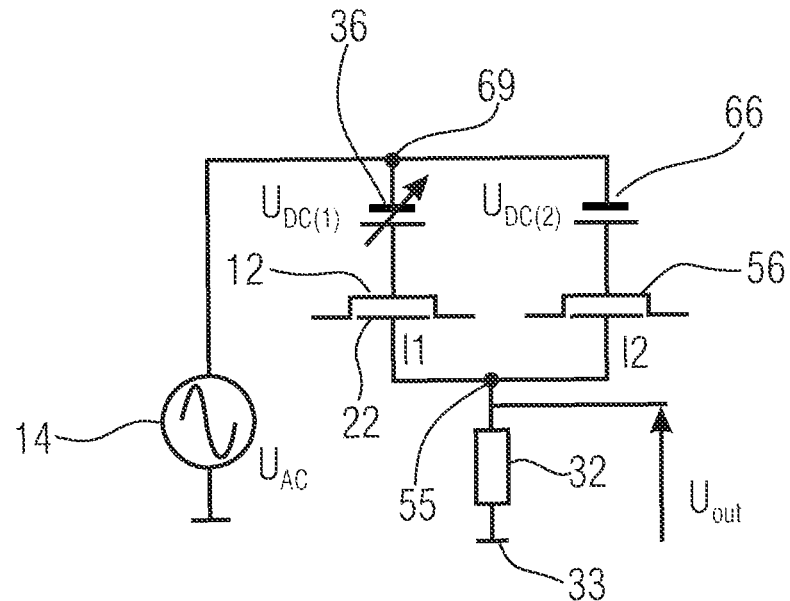
FIG. 10 shows an equivalent diagram for controlling and tapping a mechanical oscillator and a mechanical reference oscillator while adding the output signals of same in accordance with an embodiment.

FIG. 10 shows an equivalent diagram of additive signal processing of the mechanical oscillator 12 and of the mechanical reference oscillator 56. The mechanical oscillator 12, which is biased via the adjustable electric voltage source 36, is connected in parallel to the mechanical reference oscillator 56, which is biased by the electrical voltage 66, and shares a node 69 with the reference oscillator 56. It is via said node 69 that the excitation unit 14 is connected in series to the mechanical oscillator 12 and to the mechanical reference oscillator 56. It is via a second shared node 55 of the parallel connection that the fixed electrodes, which are located opposite the mechanical oscillators 12 and 56, are connected. At this node, the parallel connection of the mechanical oscillators 12 and 56 is connected to the mass 33 via a resistor 32. Via the node 55, the evaluation unit 16 may tap the added currents of the mechanical oscillators 12 and 56. In terms of wiring, this setup corresponds to the setup shown in FIG. 8, except for the non-adjustable voltage source 66.

In this embodiment, zero balancing as is described in FIG. 9 is effected by varying the electrical voltage 36. Within the node 55, the currents of both mechanical oscillators 12 and 56 are added. The added currents of both mechanical oscillators 12 and 56 are tapped as a voltage at the node 55 by the evaluation unit 16 via the resistor 32. In this embodiment, the frequency difference Δf is determined by detecting the jumps in a composite signal of the currents of the mechanical oscillator 12 and of the mechanical reference oscillator 56.

Alternatively, it would also be feasible for the evaluation unit 16 to not directly tap the amplitude of oscillation $\hat{w}_O$ via the mechanical oscillator and/or the oppositely located fixed electrode, but, for example, for a separate electrode to be provided for the mechanical oscillator 12 for detecting the mechanical oscillation on the part of the evaluation unit 16.

Figure 11:
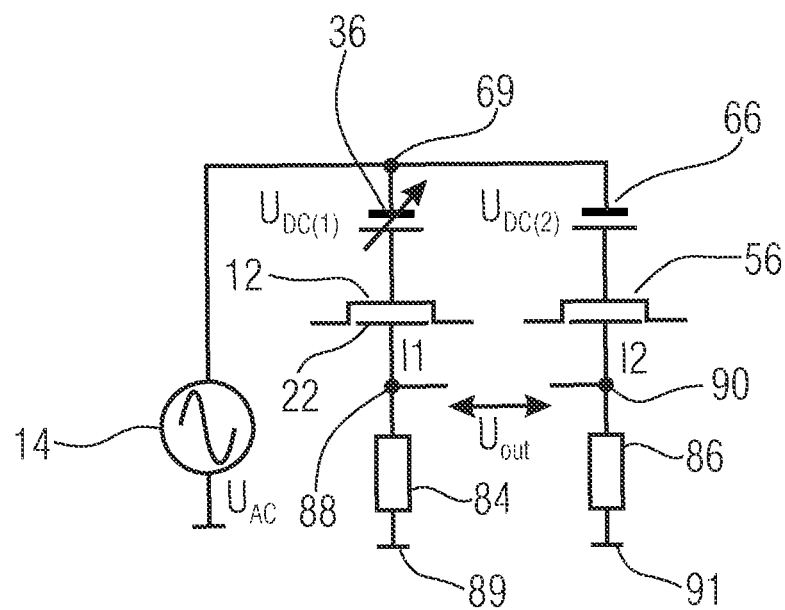
FIG. 11 shows an equivalent diagram of controlling and tapping a mechanical oscillator and a mechanical reference oscillator while subtracting the output signals of same in accordance with a further embodiment.

FIG. 11 shows an equivalent diagram for subtractively offsetting the currents of the mechanical oscillator 12 and of the mechanical reference oscillator 56 against each other. In this context, the mechanical oscillators 12 and 56, their biasing units 36 and 66 as well as the fixed electrodes are connected in parallel from node 69 onward, by analogy with FIG. 10. Also by analogy with FIG. 10, the excitation unit 14 is connected to the point 69. Unlike FIG. 10, each branch of the mechanical oscillators 12 and 56, which are connected in parallel, has resistors of its own and a mass of its own. The electrode located opposite the mechanical oscillator 12 is connected to a mass 89 via a resistor 84, the electrode located opposite the mechanical reference oscillator 56 is connected to a mass 91 via a resistor 86. In addition, this setup may correspond to the setup shown in FIG. 8 instead of the excitation unit 14, the mechanical oscillators 12 and 56, the biasing units 36 and 66, the node 55, and the resistor 32, the currents in this embodiment having to be offset against one another in a subtractive manner.

Both mechanical oscillators 12 and 56 are excited by the excitation unit 14 and biased by the electrical voltages 36 and 66. By analogy with FIG. 10, for zero balancing, the electrical voltage 36 is adjustable. At a point 88, the current of the mechanical oscillator 12 may be tapped as a voltage via the resistor 84. At a point 90, the current of the mechanical reference oscillator 56 may be tapped as a voltage via the resistor 86. In this embodiment, the voltage difference between the point 88 and the point 90 is determined via the evaluation unit 16, and thus the currents of the amplitudes of oscillation $\hat{I}$ of the resonance oscillations of both mechanical oscillators 12 and 56 are subtracted for differential evaluation 60. In this embodiment, the frequency difference Δf is determined by detecting the jumps in a differential signal of the currents of the amplitude of oscillation $\hat{I}$ of the mechanical oscillator 12 and of the mechanical reference oscillator 56.

As an alternative to additive or subtractive processing of the currents, further methods such as separate tapping of the two signals, or a combination of addition and subtraction, are also possible. It is also obvious to persons skilled in the art that further processing of the electrical output signals of the mechanical oscillators 12 and 56 is independent of whether the electrical output signals are supplied to the evaluation unit 16 as a voltage or as current, for example.

Figure 12:
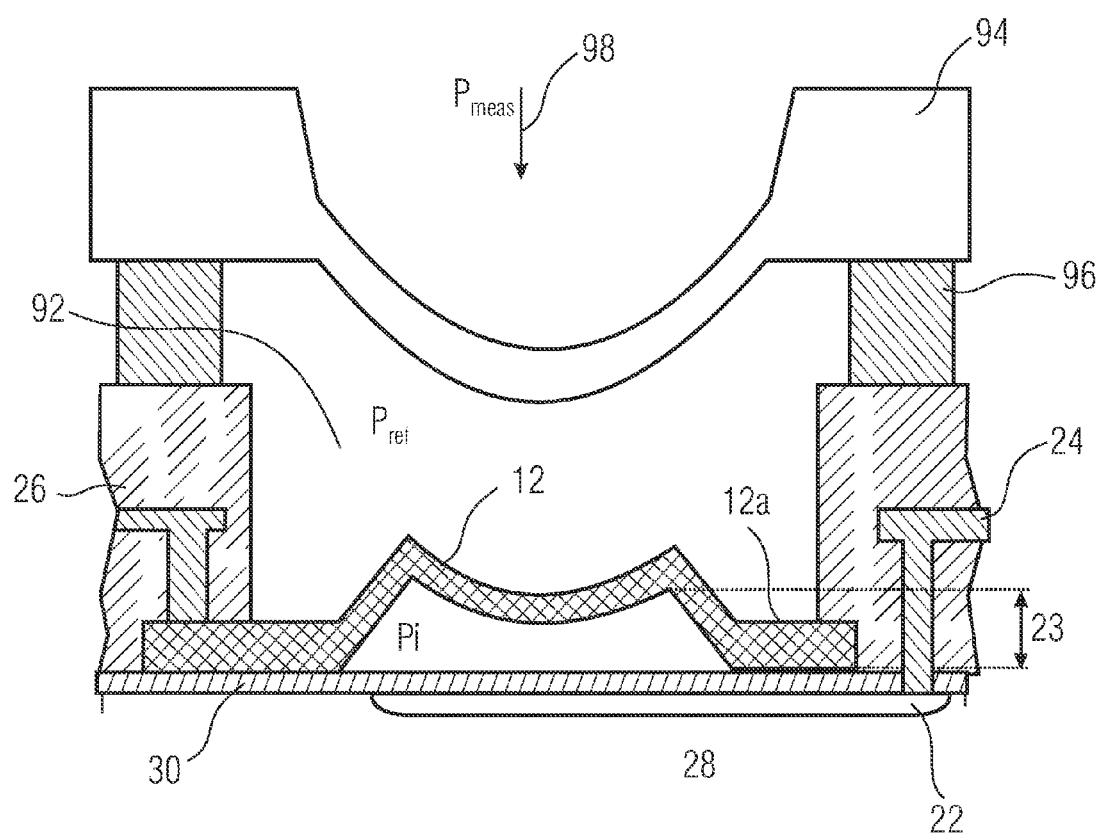
FIG. 12 shows a schematic sectional side view of a pressure sensor in accordance with an embodiment.

FIG. 12 shows a further embodiment of the inventive sensor device comprising the mechanical oscillator 12, the fixed electrode 22, the insulator 30, the contacts 24 and 26. The mechanical oscillator 12, configured as a membrane, is arranged at a distance sp 23 opposite the fixed electrode 22 and thus encompasses the internal volume 28 having a pressure $p_i$. In addition, the sensor device comprises a housing 96 and an outer membrane 94, so that a volume 92 having a pressure $p_{ref}$ is enclosed between it and the outer side of the membrane 12 of the mechanical oscillator 12. In addition, the setup may correspond to the device 10 described with regard to FIG. 2, with the exception of the outer membrane 94.

Because of the separate housing 96 and the outer membrane 94, the pressure coupling to the mechanical oscillator 12 is decoupled, and even at high pressures, a jump 20 may form in the event of sufficiently small attenuation λ. The actual pressure sensor is introduced into a pressure-tight housing in the form of a membrane 12 evacuated on the inner surface ($p_i \ll p_{ref}$), which housing had been sealed at a comparatively low reference pressure $p_{ref}$, for example 1 to 100 mbar. The housing has an outer membrane 94 applied to it which reduces, by means of a change in the external pressure $p_{mess}$ 98, the volume 92 above the membrane of the mechanical oscillator 12, and thus changes the pressure acting on the mechanical oscillator 12. By means of this measure, the mechanical oscillator 12 may be operated within an advantageous pressure range and at a comparatively high Q factor while still being able to measure high external pressures.

As an alternative to the embodiment described, the housing may also be configured in the form of a cover that has been soldered on. The cover may be part of an SOI or PSOI wafer, for example. The film is used as a movable outer membrane 94. The cover is advantageously provided with an electro-deposited soldering frame of Cu and Sn. The wafer surface is provided with an associated second solder frame (Cu, Sn). Both parts are soldered in a pressure-tight and/or vacuum-tight manner at a predefined pressure $P_{ref}$ within an enclosed volume 92, for example using the so-called SLID (solid liquid interdiffusion) soldering technique.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

The above-described embodiments merely represent an illustration of the principles of the present invention. It is understood that other persons skilled in the art will appreciate any modifications and variations of the arrangements and details described herein. This is why the invention is intended to be limited only by the scope of the following claims rather than by the specific details that have been presented herein by means of the description and the discussion of the embodiments.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A sensor device comprising:
 a mechanical oscillator configured as a membrane which encloses an internal volume on its inner surface;
 an excitation unit configured to excite the mechanical oscillator to perform a mechanical oscillation within a non-linear range at a varying excitation frequency $\omega$;
 an evaluation unit configured to detect a jump, arising as a result of anharmonicity, in a resonance of the mechanical oscillation of the mechanical oscillator; and
 a mechanical reference oscillator,
 wherein the excitation unit is configured to excite the mechanical reference oscillator to perform a mechanical oscillation within a non-linear range at the varying excitation frequency $\omega$ of the mechanical oscillator, and
 wherein the evaluation unit is configured to perform a differential evaluation between the jump in the resonance of the mechanical oscillation of the mechanical oscillator and a jump in a resonance of the mechanical oscillation of the mechanical reference oscillator.

2. The device as claimed in claim 1, further comprising a fixed electrode and wherein the mechanical oscillator comprises a movable electrode which is located opposite the fixed electrode.

3. The device as claimed in claim 1, wherein the mechanical oscillator is coated with a functional layer, and the evaluation unit is configured to determine, on the basis of the jump in the resonance of the mechanical oscillation, a value which depends on a mass of analytes at the functional layer.

4. The device as claimed in claim 1, wherein the evaluation unit is configured to determine, on the basis of the jump in the resonance of the mechanical oscillation, a value which depends on a pressure difference acting on the membrane between the inner surface and an outer surface of the membrane.

5. The device as claimed in claim 1, further comprising an outer membrane which encloses a volume between the outer membrane and an outer surface of the membrane of the mechanical oscillator.

6. The device as claimed in claim 1, further comprising a biasing unit configured to vary a bias voltage $U_{DC}$ of the mechanical oscillator so that a characteristic of the jump in the resonance of the mechanical oscillator is affected.

7. The device as claimed in claim 1, wherein the evaluation unit is configured to detect the jump according to an electric quantity at a movable electrode of the mechanical oscillator and/or at a fixed electrode located opposite the movable electrode.

8. The device as claimed in claim 1, further comprising a biasing unit configured to vary a bias voltage $U_{DC}$ of the mechanical reference oscillator such that a characteristic of the jump in the resonance of the mechanical oscillation of the mechanical reference oscillator is affected.

9. The device as claimed in claim 1, comprising a biasing unit for the mechanical reference oscillator and/or a biasing unit for the mechanical oscillator, said biasing units being configured to vary a bias voltage $U_{DC}$ of the mechanical reference oscillator and/or a bias voltage $U_{DC}$ of the mechanical oscillator such that a characteristic of the jump in the resonance of the mechanical oscillation of the mechanical reference oscillator is balanced out as compared to a characteristic of the jump in the resonance of the mechanical oscillation of the mechanical oscillator.

10. The device as claimed in claim 9, wherein the biasing unit for the mechanical oscillator affects a characteristic of the jump in the resonance of the mechanical oscillation of the mechanical oscillator, wherein the biasing unit for the mechanical oscillator and/or for the mechanical reference oscillator is configured to apply, for generating the bias voltage, an electrical voltage between a fixed electrode and a movable electrode of the mechanical oscillator and/or the mechanical reference oscillator.

11. The device as claimed in claim 1, wherein the excitation unit is configured to vary the excitation frequency ω, and wherein the evaluation unit is configured to differentially compare the jumps in the resonance of the mechanical oscillations of the mechanical oscillator and of the mechanical reference oscillator, while the excitation frequency ω is varied, according to peak values in the amplitudes of oscillation Î or according to phase changes in the resonance oscillations.

12. The device as claimed in claim 11, wherein the evaluation unit is configured to determine a frequency difference of the jump in the resonance of the mechanical oscillation of the mechanical oscillator from the jump in the resonance of the mechanical oscillation of the mechanical reference oscillator.

13. The device as claimed in claim 12, wherein the frequency difference is determined by detecting the jumps in a composite signal of electrical output signals of the mechanical oscillator and of the mechanical reference oscillator.

14. The device as claimed in claim 12, wherein the frequency difference is determined by detecting the jumps in a differential signal of electrical output signals of the mechanical oscillator and of the mechanical reference oscillator.

15. The device as claimed in claim 2, wherein the fixed electrode is configured as an implanted electrode and/or wherein the movable electrode of the mechanical oscillator is formed as a membrane made of polysilicon.

16. The device as claimed in claim 15, wherein the movable electrode, formed as a membrane, of the mechanical oscillator is sealed with silicon nitride.

17. The device as claimed in claim 1, wherein at least the mechanical oscillator and the evaluation unit are integrated into a CMOS circuit.

18. The device as claimed in claim 1, wherein the membrane has a closed form in order to increase mechanical robustness.

19. A method of operating a sensor device comprising a mechanical oscillator and a mechanical reference oscillator, the method comprising:
    exciting the mechanical oscillator, configured as a membrane, to perform a mechanical oscillation within a non-linear range at a varying excitation frequency ω;
    varying the excitation frequency ω;
    detecting a jump, arising as a result of anharmonicity, in a resonance of the mechanical oscillation of the mechanical oscillator;
    exciting the mechanical reference oscillator to perform a mechanical oscillation within a non-linear range at the varying excitation frequency co of the mechanical oscillator; and
    performing a differential evaluation between the jump in the resonance of the mechanical oscillation of the mechanical oscillator and a jump in a resonance of the mechanical oscillation of the mechanical reference oscillator; wherein
    the membrane hermetically encloses an internal volume on an inner surface of the membrane; and
    the detection of the jump in the resonance of the mechanical oscillation is performed according to a peak value in an amplitude of oscillation Î or a phase change in the resonance of the mechanical oscillation of the mechanical oscillator while the excitation frequency ω is varied.

20. A non-transitory computer readable medium including a computer program comprising a program code for performing, when the program runs on a computer, the method of operating a sensor device comprising a mechanical oscillator and a mechanical reference oscillator, said method comprising:
    exciting the mechanical oscillator, configured as a membrane, to perform a mechanical oscillation within a non-linear range at a varying excitation frequency ω;
    varying the excitation frequency ω;
    detecting a jump, arising as a result of anharmonicity, in a resonance of the mechanical oscillation of the mechanical oscillator;
    exciting the mechanical reference oscillator to perform a mechanical oscillation within a non-linear range at the varying excitation frequency co of the mechanical oscillator; and
    performing a differential evaluation between the jump in the resonance of the mechanical oscillation of the mechanical oscillator and a jump in a resonance of the mechanical oscillation of the mechanical reference oscillator; wherein
    the membrane hermetically encloses an internal volume on an inner surface of the membrane; and
    the detection of the jump in the resonance of the mechanical oscillation is performed according to a peak value in an amplitude of oscillation Î or a phase change in the resonance of the mechanical oscillation of the mechanical oscillator while the excitation frequency ω is varied.

* * * * *

UNITED STATES PATENT AND TRADEMARK OFFICE
CERTIFICATE OF CORRECTION

PATENT NO.       : 9,032,797 B2
APPLICATION NO.  : 13/370464
DATED            : May 19, 2015
INVENTOR(S)      : Andreas Goehlich et al.

Page 1 of 1

It is certified that error appears in the above-identified patent and that said Letters Patent is hereby corrected as shown below:

IN THE CLAIMS

The following should be corrected in Claim 19, column 20, line 13 as follows:

"...frequency $\omega$ of the mechanical..."

The following should be corrected in Claim 20, column 20, line 42 as follows:

"...frequency $\omega$ of the mechanical..."

Signed and Sealed this
Twenty-third Day of February, 2016

Michelle K. Lee
*Director of the United States Patent and Trademark Office*